No. 706,588. Patented Aug. 12, 1902.
W. E. NICKERSON.
APPARATUS FOR FEEDING WEIGHING MACHINES.
(Application filed Feb. 8, 1898.)
(No Model.) 4 Sheets—Sheet 1.

WITNESSES:
Frank G. Parker
William H. Parry.

INVENTOR:
William Emery Nickerson

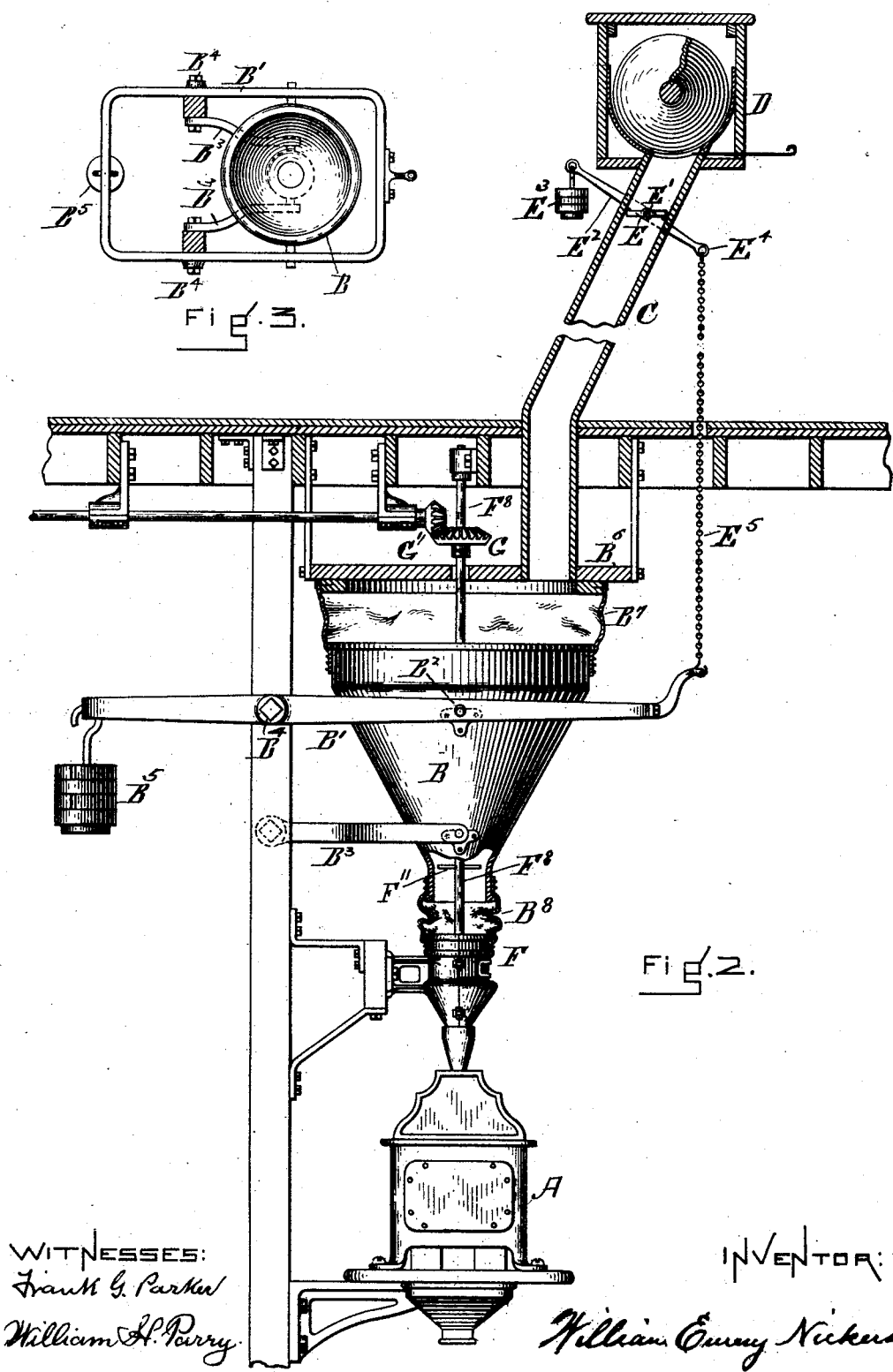

No. 706,588. Patented Aug. 12, 1902.
W. E. NICKERSON.
APPARATUS FOR FEEDING WEIGHING MACHINES.
(Application filed Feb. 8, 1898.)

(No Model.) 4 Sheets—Sheet 3.

WITNESSES:
INVENTOR

No. 706,588. Patented Aug. 12, 1902.
W. E. NICKERSON.
APPARATUS FOR FEEDING WEIGHING MACHINES.
(Application filed Feb. 8, 1898.)

(No Model.) 4 Sheets—Sheet 4.

UNITED STATES PATENT OFFICE.

WILLIAM EMERY NICKERSON, OF CAMBRIDGE, MASSACHUSETTS, ASSIGNOR, BY MESNE ASSIGNMENTS, TO THE NEW ENGLAND AUTOMATIC WEIGHING MACHINE COMPANY, OF PORTLAND, MAINE, A CORPORATION OF MAINE.

APPARATUS FOR FEEDING WEIGHING-MACHINES.

SPECIFICATION forming part of Letters Patent No. 706,588, dated August 12, 1902.

Application filed February 8, 1898. Serial No. 669,499. (No model.)

*To all whom it may concern:*

Be it known that I, WILLIAM EMERY NICKERSON, of Cambridge, in the county of Middlesex and State of Massachusetts, have invented a new and useful Improvement in Apparatus for Feeding Weighing-Machines, of which the following, taken in connection with the accompanying drawings, is a specification.

In operating weighing-machines it is frequently desirable to supply them from a bin or receptacle in which an approximately uniform quantity of material is maintained in order that a steady equality of conditions may prevail and to deliver to the weighing-machines from such a receptacle a regular and even stream of the material to be weighed. In practice it is often found necessary to convey material to a weighing-machine from a point several floors above it. With coarsely-granular substances this gives little trouble, as they will readily flow downward in a steady stream through a vertical or inclined chute, even though such chute be completely filled, but with most powdery substances—flour, for example—much difficulty is experienced, as they do not flow through chutes of ordinary size, even though the chutes be vertical, if they are filled or have stood full for a short time. Furthermore, fine powders when in motion, and especially when more or less charged or mingled with air, obey to some extent laws pertaining to fluids in the matters of flow and pressure, creating at times great pressure within the chutes and connected apparatus, especially when the chutes are high.

My present invention is intended to provide a simple and effective apparatus which will overcome the difficulties above recited and deliver to a weighing-machine a continuous and even stream of the [material to be weighed, whether granular or powdery in its nature.

A preferred form of my invention is illustrated in the accompanying drawings, in which—

Figure 1:
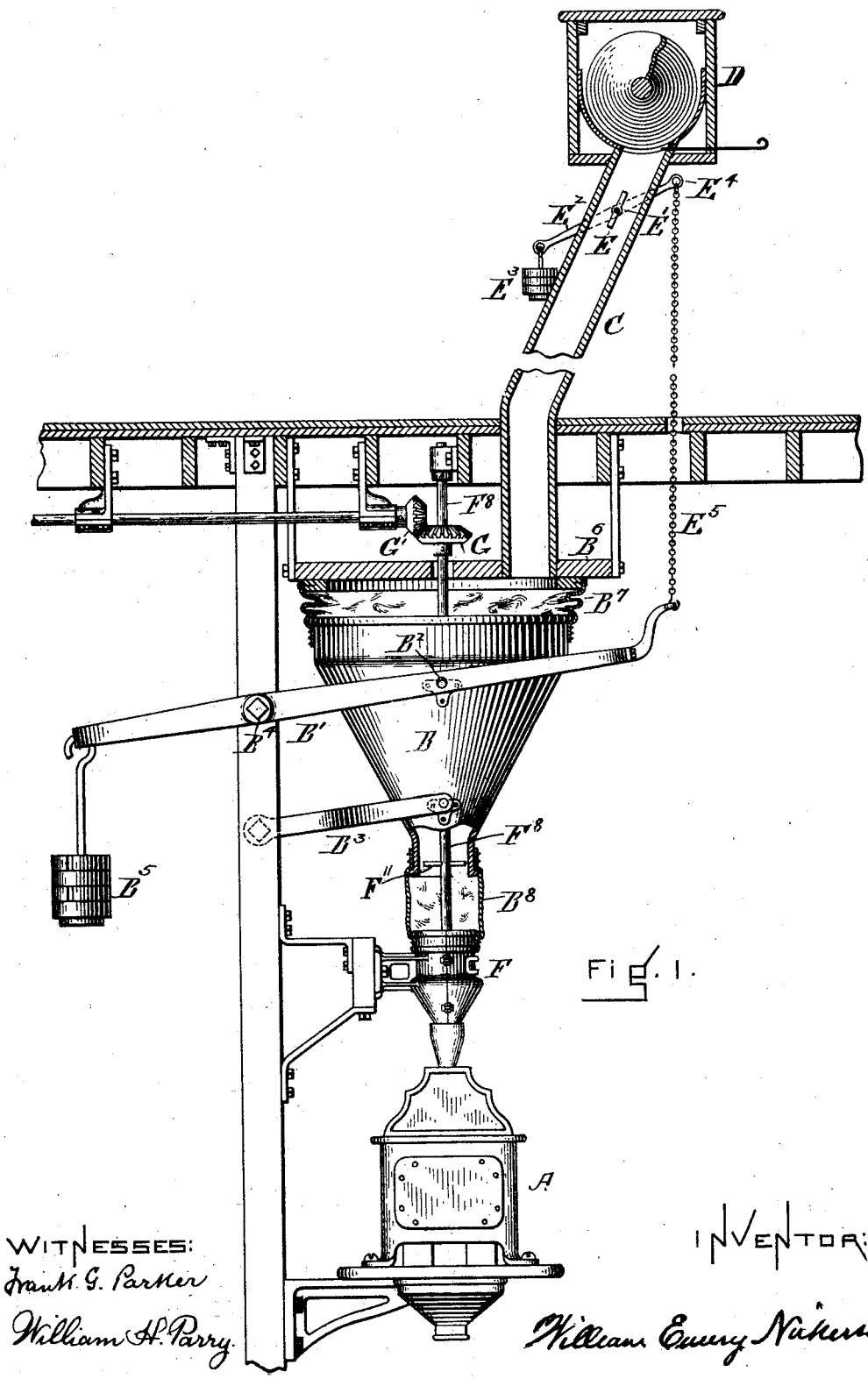
Figure 4:
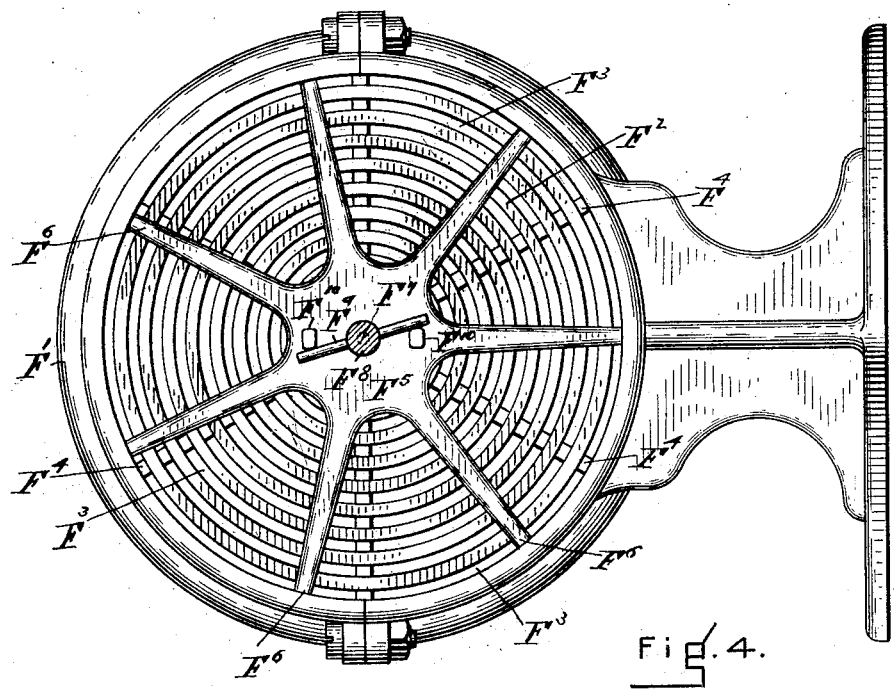
Figure 5:
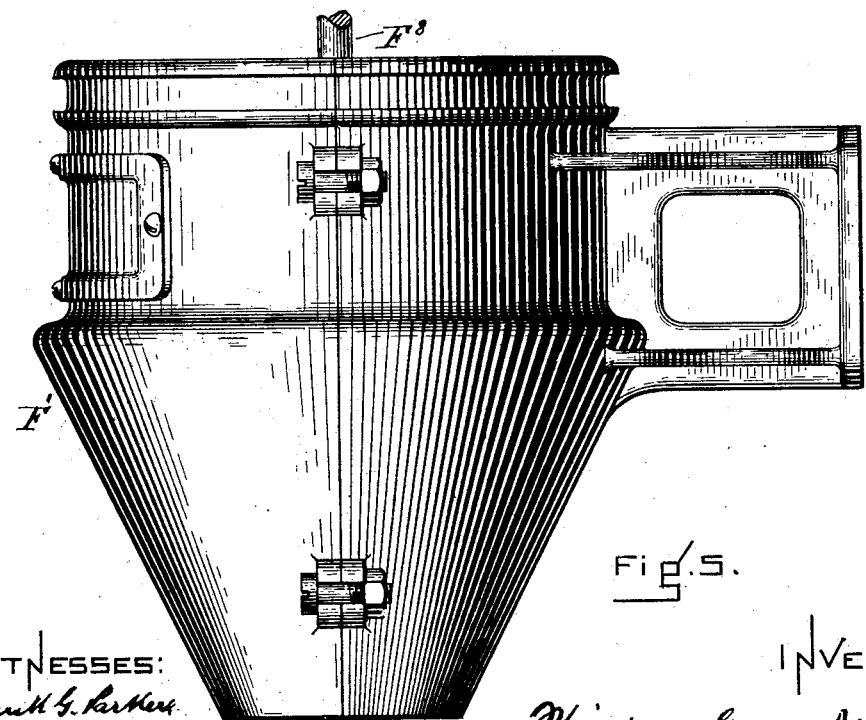
Figure 6:
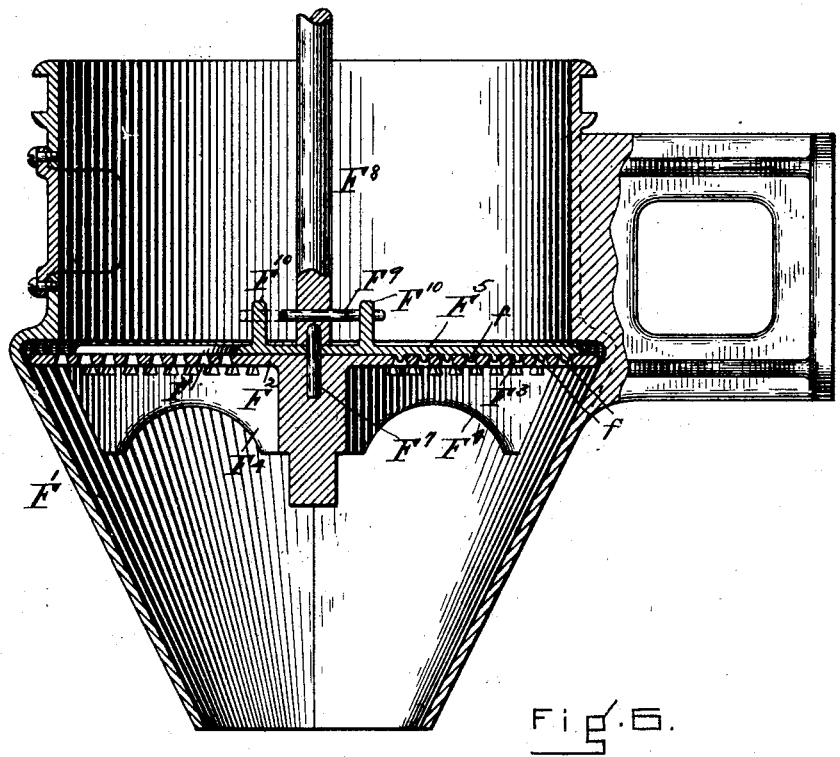
Figure 7:
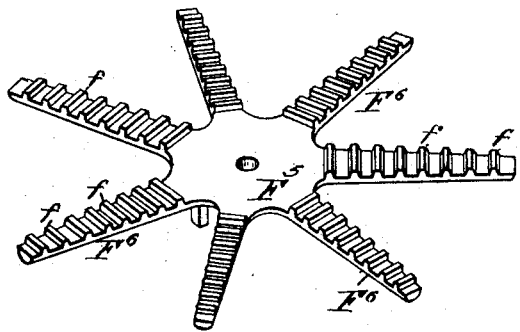

Figure 1 is a side view of the complete apparatus, partly in elevation and partly in section. Fig. 2 is a view similar to Fig. 1, but showing certain movable parts in a different position. Fig. 3 is a plan view, on a reduced scale, of a movable receptacle and its supporting mechanism. Fig. 4 is an enlarged plan view of a device for receiving the material from the movable receptacle and feeding it into a weighing-machine. Fig. 5 is a side elevation of the casing shown in Fig. 4, and Fig. 6 is a central vertical section through said casing and the parts contained therein. Fig. 7 is a perspective view of a stirring device, shown inverted in order to disclose the construction of what is normally its under side.

In the drawings, A, Figs. 1 and 2, represents a weighing-machine, the construction of which it is not necessary to consider in detail, as it may be of any desired type and forms no part of the subject-matter of my present invention.

Above the weighing-machine A, I provide a bin or receptacle B, so arranged as to be movable according to the quantity of material which it contains. To this end I prefer to mount the bin B on a pivoted frame B' by means of trunnions $B^2 B^2$, the bottom of the bin being guided, as by pivoted arms $B^3 B^3$, whereby the movement of the bin is made substantially vertical. The frame B' turns upon pivot-bolts $B^4 B^4$, and the bin B is counterbalanced by any suitable means, such as a counterweight $B^5$, suspended from the frame B' on that side of the bolts $B^4 B^4$ which is opposite the bin and having sufficient weight to balance the bin, together with about the quantity of material which it is desired to maintain therein. The bin B receives its supply of material through a chute C, which is represented as extending from the top of the bin upward to a conveyer D or other source of supply adapted to feed the material continuously into the chute C. The passage of the material through the chute C is controlled by suitable means, such as a valve E, which is preferably of the semirotary sort and mounted on a shaft E', extending through the chute C near its upper end. It is assumed that the source of supply D is adapted to feed into the chute C a stream of material more than sufficient to supply the weighing-machine, so that in order to equalize the supply of material to the quantity delivered to the weighing-machine the valve E may be operated to cut off said supply wholly or in part. The operation of the valve E is controlled by the movements of the bin B by means of suitable connections, which may consist of an arm $E^2$, secured to one end of the shaft $E'$ outside of the casing C and provided at one end with a weight $E^3$, tending to open the valve E, and at its other end $E^4$ with a chain $E^5$, connected to the frame $B'$. As thus constructed when a sufficient amount of material has passed into the bin to cause said bin and its contents to overbalance the counterweight $B^5$, and thus to descend toward or into the position shown in Fig. 2, the end $E^4$ of the arm $E^2$ will thereby be pulled downward by the chain $E^5$, thus partially or wholly closing the valve E and arresting the flow of material into the bin. When, on the other hand, the material has been drawn from the bin until the counterweight $B^5$ overbalances the bin and its load, the bin will rise toward or into the position shown in Fig. 1, thereby slackening the chain $E^5$ and allowing the weight $E^3$ to open the valve E and admit a further supply of material to the bin B. It will be understood that these movements of the bin B are not necessarily from one extreme position to the other and that the bin may be made to regulate its contents by slight movements one way or the other, so that an approximately constant amount of material will be maintained in the bin B and the chute C will be kept a free channel, and thus prevented from filling up and clogging.

In order to render the bin B dust-tight during its movements, I prefer to connect it at its top with a fixed platform $B^6$, located above it, by a band $B^7$, of cloth or other flexible material, secured to said parts, and the lower end of the bin may be similarly connected by a flexible band $B^8$ with a stationary feeding device F, hereinafter described. The chute C by extending through and penetrating the platform $B^6$ completes a dust-tight passageway from the bin to the source of supply, in this case the conveyer D.

The remaining portion of my invention relates to a feeding device for transmitting the material with a regular flow from the bin B to the weighing-machine A.

My preferred form of feeding device is designated as a whole in Figs. 1 and 2 by the letter F and is shown in detail in Figs. 4, 5, 6, and 7, in which $F'$ represents a suitable casing, emptying at its lower end into the weighing-machine A and supporting within itself a horizontal disk $F^2$, in which are cut a number of concentric circular slots $F^3$, preferably slightly wider at the under side of the disk than at its top. The ring-shaped portions of the disk located between the circular slots are maintained in position by attachment to spokes $F^4$, located beneath the disk, being preferably cast integral therewith. Upon the disk $F^2$ rests a rotary agitator $F^5$, which may consist of a number of radial arms $F^6$, connected by a central portion, which is journaled on and held in position by a vertical pin $F^7$, firmly fixed in the center of the disk $F^2$. The agitator $F^5$ is given its rotary motion by suitable means, such as a vertical shaft $F^8$, provided near its lower end with a cross-pin $F^9$, adapted to engage vertical pins $F^{10}$, secured to the top of the agitator. The vertical driving-shaft $F^8$ may be recessed at its lower end to receive the pin $F^7$, by which it will be centered and on which it will turn, said shaft being continuously driven through bevel-gears G $G'$ by any suitable mechanism. The arms $F^6$ of the agitator $F^5$ are preferably provided on the under side with short projections $f$, Figs. 6 and 7, which enter the circular slots $F^3$ and keep them from clogging with the material, and since each slot forms a complete circle there will be no obstruction to the continuous motion of said projections therein. The rotation of the agitator causes the material to fall through the slots $F^3$, the latter being sufficiently narrow to prevent the material from flowing through them unless the agitator is in motion, and in order to provide against the periodic coinciding of the arms $F^6$ with the spokes $F^4$, whereby the continuity of the flow of material would be momentarily interrupted, I prefer to have the spokes $f^4$ and arms $F^6$ unequal in number—for example, six spokes and seven arms, as shown in the drawings—so that in all positions of the agitator $F^5$ some of the arms $F^6$ will be out of coincidence with any spoke $F^4$, and hence will be active in feeding the material in the manner above described. I have shown the shaft $F^8$ as provided with one or more projecting pins $F^{11}$, Figs. 1 and 2, located within the lower end of the bin B, which serve to prevent any possibility of clogging in the contracted lower portion of said bin and assist in the delivery of the material therefrom. Thus the amount of material in the bin B being kept approximately constant in the manner above described the feeding device F will transmit therefrom to the weighing-machine A a uniform and steady stream of material, as will be sufficiently apparent without further description.

I claim as my invention—

1. In a feeding apparatus for weighing-machines, the combination of a chute adapted to receive a supply of material at its upper end, the height of said chute being greater than its transverse dimensions, a movable receptacle arranged to receive material from the lower end of said chute and to transmit the same to a weighing-machine, said receptacle being operated by the weight of a predetermined amount of said material, and means operative with the movements of said receptacle for controlling the admission of the material to the upper end of said chute.

2. In a feeding apparatus for weighing-machines, the combination of a chute adapted to receive a supply of material at its upper end, the height of said chute being greater than its transverse dimensions, a movable receptacle adapted to receive material from said chute and to transmit the same to a weighing-machine, said receptacle being provided with a counterbalance the weight of which is substantially equal to the weight of said receptacle together with a quantity of material sufficient to fill the same to a predetermined depth, a valve located at the upper end of said chute, and operating connections between said valve and receptacle.

3. In a feeding apparatus for weighing-machines, the combination of a movable receptacle arranged to be operated when partially filled with material, a positively-driven feeding device for transferring material from said receptacle to a weighing-machine, and means operated by the movements of said receptacle for controlling the admission of material thereto, and thereby maintaining a substantially constant depth of material above the feeding device.

4. In a feeding apparatus for weighing-machines, a stationary supply-chute, a stationary casing adapted to deliver material to a weighing-machine, a movable receptacle located between said stationary parts and connected thereto by flexible dust-proof connections, and means operative with said receptacle for controlling the admission of material to said chute.

5. In a feeding apparatus for weighing-machines, in combination, a positively-driven feeding device, a counterbalanced, vertically-movable receptacle located above the same, a chute adapted to supply material to said receptacle, flexible, dust-proof connections between said receptacle and the said chute and feeding device respectively, and a valve adapted to be operated by the movements of said receptacle and to control the admission of material thereto.

6. In a feeding apparatus for weighing-machines, a feeding device comprising in combination a casing containing a disk provided with one or more concentric, horizontal slots, an agitator located above and adjacent to said disk and adapted to rotate continuously, and means for rotating said agitator.

7. In a feeding apparatus for weighing-machines, a casing containing a disk provided with one or more concentric, horizontal slots, each slot forming a complete circle, in combination with an agitator adapted to rotate concentrically with said slots and provided with projections adapted to enter and move therein, and means for rotating said agitator.

8. In a feeding apparatus for weighing-machines, a casing containing a disk comprising a number of concentric rings connected on their bottom faces by radial spokes and spaced apart to provide a series of slots between them, in combination with an agitator comprising a number of radial arms and adapted to be rotated adjacent to said disk, said arms and spokes being unequal in number, and means for rotating said agitator continuously.

9. In a feeding apparatus for weighing-machines, the combination of a casing containing a slotted disk, a vertically-movable receptacle located above said casing, a valve operated by the movement of said receptacle for controlling the admission of material thereto, a rotary agitator above said disk, and a shaft connected to said agitator and adapted to be rotated continuously, said shaft extending upward through said movable receptacle and having near the lower end thereof one or more projecting pins.

In testimony whereof I have signed my name to this specification, in the presence of two subscribing witnesses, on this 7th day of February, A. D. 1898.

WILLIAM EMERY NICKERSON.

Witnesses:
FRANK G. PARKER,
WILLIAM H. PARRY.